US012752237B2

(12) United States Patent
Miura et al.

(10) Patent No.: US 12,752,237 B2
(45) Date of Patent: Oct. 6, 2026

(54) EXHAUST GAS PURIFICATION CATALYST

(71) Applicant: Cataler Corporation, Kakegawa (JP)

(72) Inventors: Taku Miura, Kakegawa (JP); Takashi Goto, Kakegawa (JP); Shunsuke Oishi, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 743 days.

(21) Appl. No.: 18/018,971

(22) PCT Filed: Jul. 19, 2021

(86) PCT No.: PCT/JP2021/027017
§ 371 (c)(1),
(2) Date: Jan. 31, 2023

(87) PCT Pub. No.: WO2022/030240
PCT Pub. Date: Feb. 10, 2022

(65) Prior Publication Data
US 2023/0277986 A1 Sep. 7, 2023

(30) Foreign Application Priority Data
Aug. 7, 2020 (JP) ................................ 2020-134757

(51) Int. Cl.
*B01J 23/63* (2006.01)
*B01D 53/94* (2006.01)
(Continued)

(52) U.S. Cl.
CPC ............ *B01D 53/945* (2013.01); *B01J 23/63* (2013.01); *F01N 3/0864* (2013.01); *F01N 3/101* (2013.01);
(Continued)

(58) Field of Classification Search
CPC .......... B01D 53/945; B01D 2255/1025; B01D 2255/2065; B01D 2255/9022;
(Continued)

(56) References Cited

U.S. PATENT DOCUMENTS 5,376,610 A 12/1994 Takahata et al.
6,808,687 B1 * 10/2004 Uenishi ................ B01D 53/945 422/177

(Continued)

FOREIGN PATENT DOCUMENTS

CN 102395428 A 3/2012
CN 107249737 A 10/2017
(Continued)

OTHER PUBLICATIONS

English machine translation of JP2010005566 (2010).*
(Continued)

*Primary Examiner* — Richard M Rump
(74) *Attorney, Agent, or Firm* — Young Basile Hanlon & MacFarlane, P.C.

(57) ABSTRACT

The present disclosure provides an exhaust gas purifying catalyst that may exhibit high purification performance both in a low temperature state immediately after an engine is started and during a high-load operation. The exhaust gas purifying catalyst disclosed herein contains at least one type of noble metal purifying exhaust gas, and includes a substrate, and a catalyst coat layer formed on a surface of the substrate. The catalyst coat layer is formed to have a stack structure including a lower layer provided on the substrate and an upper layer provided on the lower layer. The lower layer contains a noble metal and an oxide having an oxygen storage capacity. A noble metal-containing surface layer portion containing a noble metal is formed in at least a part
(Continued)

100 of a surface portion of the upper layer. The upper layer does not contain an oxide having the oxygen storage capacity.

8 Claims, 3 Drawing Sheets

(51) Int. Cl.
*F01N 3/08* (2006.01)
*F01N 3/10* (2006.01)

(52) U.S. Cl.
CPC ...... *F01N 3/103* (2013.01); *B01D 2255/1023* (2013.01); *B01D 2255/1025* (2013.01); *B01D 2255/2065* (2013.01); *B01D 2255/9022* (2013.01); *B01D 2257/40* (2013.01); *B01D 2257/502* (2013.01); *B01D 2257/702* (2013.01); *B01D 2258/01* (2013.01); *F01N 2510/06* (2013.01); *F01N 2570/12* (2013.01); *F01N 2570/14* (2013.01); *F01N 2570/16* (2013.01)

(58) Field of Classification Search
CPC .......... B01D 2257/40; B01D 2257/502; B01D 2257/702; B01J 23/63; F01N 3/0864; F01N 3/101; F01N 3/103; F01N 2510/06; F01N 2510/12; F01N 2510/14; F01N 2510/16
See application file for complete search history.

(56) References Cited

U.S. PATENT DOCUMENTS

| | | | | |
|---|---|---|---|---|
| 7,622,096 | B2 * | 11/2009 | Deeba | B01D 53/945 422/177 |
| 7,754,171 | B2 * | 7/2010 | Chen | B01J 37/0244 60/302 |
| 7,758,834 | B2 | 7/2010 | Chen et al. | |
| 7,875,250 | B2 | 1/2011 | Nunan | |
| 8,007,750 | B2 | 8/2011 | Chen et al. | |
| 8,323,599 | B2 | 12/2012 | Nunan et al. | |
| 8,394,348 | B1 | 3/2013 | Nunan et al. | |
| 8,501,661 | B2 | 8/2013 | Sunada et al. | |
| 8,530,372 | B2 | 9/2013 | Luo et al. | |
| 8,546,296 | B2 | 10/2013 | Yabuzaki et al. | |
| 8,580,705 | B2 | 11/2013 | Aoki et al. | |
| 8,580,706 | B2 * | 11/2013 | Matsueda | B01J 37/0244 502/355 |
| 8,853,120 | B2 | 10/2014 | Aoki et al. | |
| 8,950,174 | B2 | 2/2015 | Hilgendorff | |
| 8,968,690 | B2 | 3/2015 | Nunan et al. | |
| 9,387,461 | B2 | 7/2016 | Wu et al. | |
| 9,440,223 | B2 | 9/2016 | Aoki | |
| 9,550,176 | B2 | 1/2017 | Sato et al. | |
| 9,597,660 | B2 | 3/2017 | Aoki | |
| 9,675,970 | B2 | 6/2017 | Matsueda et al. | |
| 9,694,348 | B2 | 7/2017 | Hoshino et al. | |
| 9,839,902 | B2 | 12/2017 | Suzuki et al. | |
| 10,010,873 | B2 | 7/2018 | Aoki | |
| 10,307,736 | B2 * | 6/2019 | Saito | B01J 35/19 |
| 10,413,885 | B2 | 9/2019 | Suzuki et al. | |
| 10,576,420 | B2 | 3/2020 | Chinzei et al. | |
| 10,576,458 | B2 | 3/2020 | Imada et al. | |
| 10,618,034 | B2 | 4/2020 | Kasuya et al. | |
| 10,625,243 | B2 | 4/2020 | Clowes et al. | |
| 10,688,476 | B2 | 6/2020 | Onoe et al. | |
| 10,850,269 | B2 | 12/2020 | Tanaka et al. | |
| 11,110,435 | B2 | 9/2021 | Onoe et al. | |
| 11,203,958 | B2 | 12/2021 | Clowes et al. | |
| 11,248,505 | B2 | 2/2022 | Sung et al. | |
| 11,260,372 | B2 | 3/2022 | Xue et al. | |
| 11,286,830 | B2 | 3/2022 | Saito et al. | |
| 11,420,189 | B2 | 8/2022 | Sawada et al. | |
| 11,577,234 | B2 | 2/2023 | Dong et al. | |
| 11,904,299 | B2 | 2/2024 | Zheng et al. | |
| 2003/0100447 | A1 | 5/2003 | Deeba et al. | |
| 2003/0147796 | A1 * | 8/2003 | Suga | B01J 37/0244 502/328 |
| 2009/0175773 | A1 | 7/2009 | Chen et al. | |
| 2009/0240643 | A1 | 9/2009 | Bridgewater et al. | |
| 2012/0094827 | A1 | 4/2012 | Matsueda et al. | |
| 2012/0149557 | A1 | 6/2012 | Hoshino et al. | |
| 2013/0150236 | A1 | 6/2013 | Aoki | |
| 2015/0111727 | A1 | 4/2015 | Nagashima | |
| 2015/0273462 | A1 | 10/2015 | Iwakura et al. | |
| 2016/0199816 | A1 | 7/2016 | Matsueda et al. | |
| 2016/0288096 | A1 | 10/2016 | Fujiwara et al. | |
| 2016/0288099 | A1 | 10/2016 | Goto et al. | |
| 2017/0189892 | A1 | 7/2017 | Yin et al. | |
| 2017/0296968 | A1 | 10/2017 | Yoshida et al. | |
| 2018/0021726 | A1 | 1/2018 | Onoe et al. | |
| 2018/0071679 | A1 | 3/2018 | Karpov et al. | |
| 2018/0304238 | A1 | 10/2018 | Saito et al. | |
| 2019/0083932 | A1 | 3/2019 | Onozuka et al. | |
| 2019/0136730 | A1 | 5/2019 | Onozuka et al. | |
| 2019/0193057 | A1 | 6/2019 | Hoshino et al. | |
| 2019/0209967 | A1 | 7/2019 | Shino et al. | |
| 2019/0291083 | A1 | 9/2019 | Komata et al. | |
| 2020/0276567 | A1 | 9/2020 | Onoe et al. | |
| 2020/0316579 | A1 | 10/2020 | Takesue et al. | |
| 2021/0094027 | A1 * | 4/2021 | Oishi | B01D 53/9422 |
| 2021/0310391 | A1 | 10/2021 | Kasuya et al. | |
| 2022/0055021 | A1 | 2/2022 | Liu et al. | |
| 2022/0105494 | A1 | 4/2022 | Morita et al. | |
| 2022/0154621 | A1 | 5/2022 | Noguchi et al. | |
| 2022/0176354 | A1 | 6/2022 | Noguchi et al. | |
| 2022/0191236 | A1 | 6/2022 | Henderson | |
| 2022/0193639 | A1 | 6/2022 | Vjunov et al. | |
| 2022/0203339 | A1 | 6/2022 | Zheng et al. | |
| 2023/0277986 | A1 | 9/2023 | Miura et al. | |
| 2023/0302438 | A1 | 9/2023 | Onoe et al. | |
| 2024/0139716 | A1 | 5/2024 | Nishio et al. | |
| 2024/0165591 | A1 | 5/2024 | Noguchi et al. | |

FOREIGN PATENT DOCUMENTS

| | | | | |
|---|---|---|---|---|
| CN | 108778491 | A | 11/2018 | |
| CN | 109153014 | A | 1/2019 | |
| CN | 109789388 | A | 5/2019 | |
| EP | 1900427 | A1 | 3/2008 | |
| EP | 2431092 | A1 | 3/2012 | |
| EP | 2797678 | A1 | 11/2014 | |
| EP | 2047903 | B1 | 10/2015 | |
| JP | H05293376 | A | 11/1993 | |
| JP | H0699069 | A | 4/1994 | |
| JP | H09253454 | A | 9/1997 | |
| JP | 2003210989 | A | 7/2003 | |
| JP | 2005506900 | A | 3/2005 | |
| JP | 2005279437 | A | 10/2005 | |
| JP | 2009019537 | A | 1/2009 | |
| JP | 2010005566 | A | 1/2010 | |
| JP | 2012152702 | A | 8/2012 | |
| JP | 2012217950 | A | 11/2012 | |
| JP | 2013-119075 | A | 6/2013 | |
| JP | 2014018724 | A | 2/2014 | |
| JP | 2014200714 | A | 10/2014 | |
| JP | 2015037613 | A | 2/2015 | |
| JP | 5931214 | B | 6/2016 | |
| JP | 2016185531 | A | 10/2016 | |
| JP | 6150845 | B | 6/2017 | |
| JP | 2017189735 | A | 10/2017 | |
| JP | 2018176109 | A | 11/2018 | |
| JP | 2019136695 | A | 8/2019 | |
| WO | 2009009013 | A2 | 1/2009 | |
| WO | 2009020957 | A1 | 2/2009 | |
| WO | WO-2010001226 | A1 * | 1/2010 | B01J 23/40 |
| WO | 2010119904 | A1 | 10/2010 | |
| WO | 2014002667 | A1 | 1/2014 | |
| WO | 2014156746 | A1 | 10/2014 | |
| WO | 2015079908 | A1 | 6/2015 | |
| WO | 2017/163985 | A1 | 9/2017 | |
| WO | 2017200013 | A1 | 11/2017 | |
| WO | 2017204008 | A1 | 11/2017 | |

(56) References Cited

FOREIGN PATENT DOCUMENTS

| | | | |
|---|---|---|---|
| WO | 2017213105 | A1 | 12/2017 |
| WO | 2018/016606 | A1 | 1/2018 |
| WO | 2020008981 | A1 | 1/2020 |
| WO | 2020153309 | A1 | 7/2020 |

OTHER PUBLICATIONS

International Search Report, PCT Application No. PCT/JP2021/027017, mailed Sep. 21, 2021 (3 pages).
Indonesian Office Action in ID Application No. P00202301980, issued Jul. 30, 2024 (4 pages).
International Preliminary Report on Patentability issued in International Application No. PCT/JP2021/027017 dated Feb. 16, 2023.
Examination Report issued in Indian Application No. 202327013827 dated Aug. 28, 2023.
Extended European Search Report issued in EP Application No. 21853523.5 dated Oct. 30, 2023.
International Search Report and English translation, PCT/JP2020/008991, mailed May 12, 2020 (5 pages).
Written Opinion and English translation, PCT/JP2020/008991, mailed May 12, 2020 (15 pages).
International Preliminary Report on Patentability, PCT/JP2020/008991, mailed May 12, 2020 (17 pages).
Extended European Search Report, European Application No. 20782686.8, mailed Nov. 16, 2022 (6 pages).
Office Action issued in Japanese Patent Application No. 2019-159780 dated Jul. 6, 2023.
Office Action issued in Chinese Application No. 202080062866.9 dated Mar. 9, 2024.

* cited by examiner

EXHAUST GAS PURIFICATION CATALYST

This application is a 371 national stage application of International Application No. PCT/JP2021/027017, filed Jul. 19, 2021, which claims the benefit of the filing date of Japan Application No. JP 2020-134757, filed Aug. 7, 2020, the contents of which are hereby incorporated by reference in their entirety.

TECHNICAL FIELD

The present invention relates to an exhaust gas purifying catalyst, and in more detail, to an exhaust gas purifying catalyst including a substrate and a catalyst coat layer formed on a surface of the substrate. The present application claims priority from Japanese Patent Application No. 2020-134757 filed on Aug. 7, 2020, which is incorporated by reference herein in its entirety.

BACKGROUND ART

In order to purify exhaust gas discharged from an internal combustion engine such as an automobile engine or the like, a three-way catalyst containing at least one type of noble metal among noble metals of Pt (platinum), Pd (palladium) and Rh (rhodium) is often used. According to one typical structure of such a three-way catalyst, a catalyst coat layer formed of alumina is formed on a surface of a highly heat-resistant ceramic substrate, and one or at least two types of noble metals among Pt, Pd and Rh is carried by the catalyst coat layer. Among these noble metals, Pd contributes to purification performance mainly for carbon monoxide (CO) and hydrocarbon (HC), and Rh contributes to purification performance (purification capability by reduction) mainly for $NO_x$. Therefore, combined use of Pd and Rh purifies hazardous components in the exhaust gas efficiently at a time.

For efficient purification of the components in the exhaust gas by use of such a three-way catalyst, it is desirable that the air/fuel ratio (A/F ratio), which is a mixing ratio of air and gasoline supplied to the engine, is the stoichiometric air/fuel ratio (i.e., 14.7) or in the vicinity thereof. Conventionally, for the purpose of alleviating atmospheric switching of the air/fuel ratio at which a catalyst may act effectively, a Ce-containing oxide (e.g., ceria-zirconia composite oxide) having an oxygen storage capacity (OSC) is in wide use as a carrier for the noble metals mentioned above (e.g., Patent Literature 1 through Patent Literature 4). The Ce-containing oxide acts to occlude oxygen in the exhaust gas when the air/fuel ratio of the exhaust gas is lean (i.e., in an atmosphere in which the air ratio is on a higher side), and to release the occluded oxygen when the air/fuel ratio of the exhaust gas is rich (i.e., in an atmosphere in which the fuel ratio is on a higher side). Such an action of the Ce-containing oxide allows the A/F ratio to be controlled easily even when the oxygen concentration in the exhaust gas is fluctuated, and provides stable catalyst performance of oxidizing and reducing the exhaust gas. This improves the exhaust gas purification performance of the three-way catalyst.

Recently, for further improvement in the performance of the exhaust gas purifying catalyst, a catalyst coat layer having a stack structure including at least two layers, namely, a top catalyst layer and a lower layer, has been developed instead of including one carrier layer carrying all the noble metals provided as catalysts. For example, Patent Literature 1 discloses a catalyst coat layer having a three-layer structure in which an upper layer contains Pt and/or Rh and an oxygen storage component, a middle layer does not contain an oxygen storage component but contains Pd and/or Pt, and a lower layer contains a refractory metal oxide. The catalyst coat layer includes the noble metals and the oxygen storage component located in this manner, and therefore, stably acts at a high temperature caused by an internal combustion engine and may provide an economical catalyst.

CITATION LIST

Patent Literature

Patent Literature 1: Japanese PCT Laid-Open Patent Publication No. 2005-506900

Patent Literature 2: Japanese Laid-Open Patent Publication No. 2012-217950

Patent Literature 3: WO2017/163985

Patent Literature 4: WO2017/213105

SUMMARY OF INVENTION

Technical Problem

Generally, in the case where exhaust gas still has a low temperature, for example, immediately after an engine is started, an exhaust gas purifying catalyst has not been warmed up sufficiently. This presents a drawback that purification performance of the catalyst is declined. Therefore, an exhaust gas purifying catalyst that may exhibit high purification performance in a low temperature state immediately after the engine is started is required. In addition, in a state where the engine is under a high load, there is a tendency that a large amount of, especially, $NO_x$ is discharged from the engine. This presents a problem that the exhaust gas easily passes through the exhaust gas purification catalyst without sufficient purification. At the restart of the engine also, there is a tendency that a large amount of $NO_x$ is discharged from the engine. Therefore, an exhaust gas purifying catalyst that may exhibit high purification performance during a high-load operation and at the restart of the engine is required.

The present invention made in light of the above-described problems has a main object of providing an exhaust gas purifying catalyst including a catalyst coat layer having a stack structure that may exhibit high purification performance both in a low temperature state immediately after the engine is started and during a high-load operation.

Solution to Problem

As a result of performing active studies to solve the above-described problems, the present inventors have found out that exhaust gas purification performance is preferably exhibited by an exhaust gas purifying catalyst including a substrate and a catalyst coat layer provided on the substrate and having a stack structure including a lower layer and an upper layer, in which a noble metal-containing surface layer portion containing a noble metal is formed in a surface portion of the upper layer, and an oxide having an oxygen storage capacity is located away from the noble metal. The present inventors have found out that such a structure allows the exhaust gas purification performance to be exhibited preferably both in a low temperature state immediately after the engine is started and during a high-load operation, and thus completed the present invention.

The exhaust gas purifying catalyst disclosed herein is an exhaust gas purifying catalyst located in an exhaust gas path of an internal combustion engine and containing at least one type of noble metal purifying exhaust gas discharged from the internal combustion engine. The exhaust gas purifying catalyst includes a substrate, and a catalyst coat layer formed on a surface of the substrate. The catalyst coat layer is formed to have a stack structure including a lower layer provided on the substrate and an upper layer provided on the lower layer. The lower layer contains a noble metal and an oxide having an oxygen storage capacity. A noble metal-containing surface layer portion containing a noble metal is formed in at least a part of a surface portion of the upper layer. The upper layer does not contain an oxide having the oxygen storage capacity.

According to such a structure, the upper layer that does not contain an oxide having the oxygen storage capacity is present between the noble metal-containing surface layer portion and the lower layer. Therefore, the noble metal contained in the noble metal-containing surface layer portion and the oxide having the oxygen storage capacity contained in the lower layer are located away from each other, and the noble metal contained in the noble metal-containing surface layer portion may be suppressed from being turned into an oxide. This improves the reduction activity of the noble metal, and high purification performance may be realized both in a low temperature state immediately after the engine is started and during a high-load operation.

In a preferred embodiment of the exhaust gas purifying catalyst disclosed herein, the noble metal-containing surface layer portion is formed at least from an exhaust gas entrance-side end of the substrate toward an exhaust gas exit of the substrate, and from an exhaust gas exit-side end of the substrate toward an exhaust gas entrance of the substrate. According to such a structure, high warmup characteristics and high purification performance during a high-load operation are realized preferably.

In a preferred embodiment of the exhaust gas purifying catalyst disclosed herein, the noble metal-containing surface layer portion is formed entirely from the exhaust gas entrance-side end to the exhaust gas exit-side end. According to such a structure, the reactivity of the noble metal contained in the noble metal-containing surface layer portion is improved, and high warmup characteristics and high purification performance during a high-load operation are realized preferably.

In a preferred embodiment of the exhaust gas purifying catalyst disclosed herein, the oxide having the oxygen storage capacity is a Ce-containing oxide. According to such a structure, the high oxygen storage capacity of the Ce-containing oxide allows the A/F ratio to be controlled easily, and the catalyst activity of the noble metal contained in the lower layer may be improved preferably.

In a preferred embodiment of the exhaust gas purifying catalyst disclosed herein, the lower layer contains Pd, and the noble metal-containing surface layer portion contains Rh. According to such a structure, Pd contributes to purification performance mainly for carbon monoxide (CO) and hydrocarbon (HC), and Rh contributes to purification performance mainly for $NO_x$. Therefore, more preferred exhaust gas purification performance may be realized.

In a preferred embodiment of the exhaust gas purifying catalyst disclosed herein, the noble metal-containing surface layer portion has an average thickness of 20 μm or less in a stack direction. According to such a structure, high warmup characteristics and high purification performance during a high-load operation are realized preferably.

DESCRIPTION OF EMBODIMENTS

Figure 1:
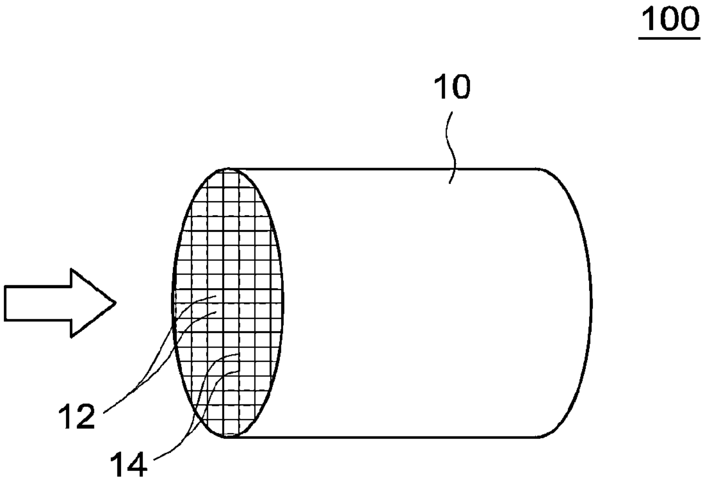
FIG. 1 is a perspective view schematically showing an exhaust gas purifying catalyst according to an embodiment.

Hereinafter, a preferred embodiment of the technology disclosed herein will be described with reference to the drawings. A matter that is other than a matter specifically referred to in this specification (e.g., a composition of a porous carrier, etc.) but is necessary to carry out the technology disclosed herein (e.g., general matter regarding, for example, the positional arrangement of the exhaust gas purifying catalyst) may be understood as a matter of design for a person of ordinary skill in the art based on the conventional technology in the art. The technology disclosed herein may be carried out based on the contents disclosed herein and the technological common knowledge in the art. In the following description, "exhaust gas having a lean air/fuel ratio", "exhaust gas having a stoichiometric air/fuel ratio", and "exhaust gas having a rich air/fuel ratio" respectively refer to exhaust gas having an air/fuel ratio equivalent to the air/fuel ratio of the exhaust gas discharged from an internal combustion engine when lean, stoichiometric and rich mixture gas is combusted by the internal combustion engine, or exhaust gas obtained by supplying hydrocarbon to the exhaust gas having the above-mentioned equivalent air/fuel ratio on a later stage.

In this specification, the expression "having an oxygen storage capacity" refers to acting to occlude oxygen in the exhaust gas when the air/fuel ratio of the exhaust gas is lean (i.e., in an atmosphere in which the air ratio is on a higher side), and to release the occluded oxygen when the air/fuel ratio of the exhaust gas is rich (i.e., in an atmosphere in which the fuel ratio is on a higher side).

In the drawings referred to below, components or portions having the same functions will bear the same reference signs, and overlapping descriptions may be omitted or simplified. In the drawings referred to below, the relationship between sizes (length, width, thickness, etc.) does not reflect the actual relationship between sizes, or does not limit the structure of the exhaust gas purifying catalyst in any way.

In this specification, a numerical range described as "A to B" (A and B are each an arbitrary numerical value) refers to "A or more and B or less", and encompasses a range that is "more than A and less than B".

An exhaust gas purifying catalyst 100 disclosed herein includes a substrate 10 and a catalyst coat layer 30 formed on a surface of the substrate 10. The catalyst coat layer 30 is formed to have a stack structure.

Figure 2:
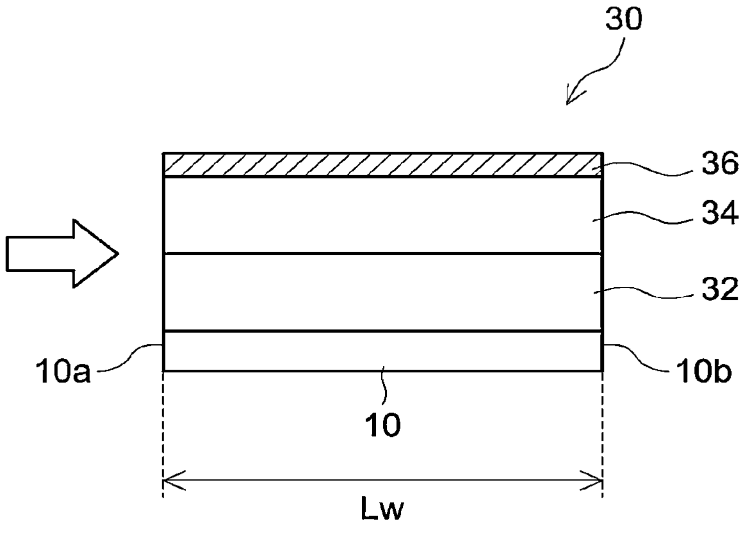
FIG. 2 is a schematic view showing a structure of a surface portion of a rib wall in the exhaust gas purifying catalyst according to an embodiment.
Figure 3:
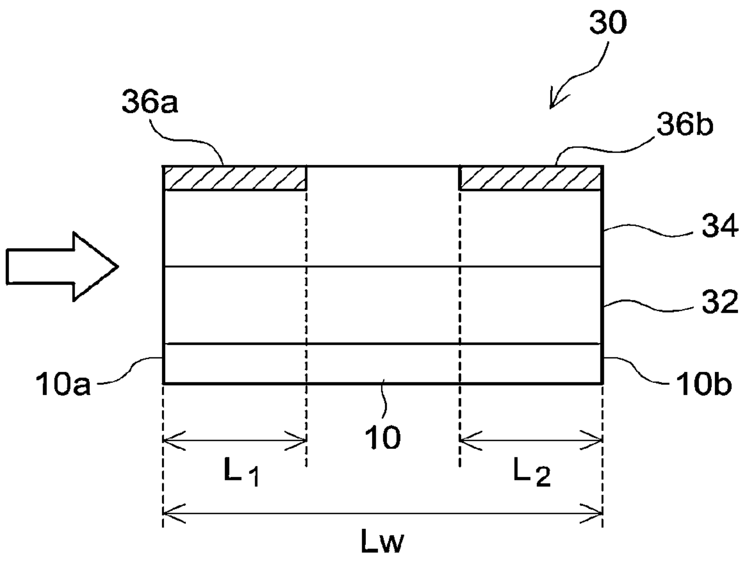
FIG. 3 is a schematic view showing a structure of the surface portion of the rib wall in the exhaust gas purifying catalyst according to an embodiment.

FIG. 1 is a perspective view schematically showing the exhaust gas purifying catalyst 100. The exhaust gas purifying catalyst 100 according to this embodiment includes the substrate 10, which includes plural cells 12 regularly aligned and a rib wall 14 forming the cells 12. In FIG. 1 through FIG. 3, arrows each indicate a direction in which exhaust gas flows.

For the substrate 10 included in the exhaust gas purifying catalyst 100 disclosed herein, any of various materials and any of various forms conventionally used for this type of use may be used. For example, a honeycomb substrate having a honeycomb structure formed of a ceramic material such as cordierite, silicon carbide (SiC) or the like, or an alloy (stainless steel, etc.), or the like is preferably usable. One example is a honeycomb substrate having a cylindrical outer shape. The honeycomb substrate includes through-holes (cells) as paths for exhaust gas extending in an axial direction of the cylinder and a wall (rib wall) partitioning the cells. The exhaust gas may contact the wall. The overall outer shape of the substrate may be an elliptical tube shape or a polygonal tube shape instead of a cylindrical shape. In this specification, the expression the "volume (capacity) of the substrate 10" refers to a bulk volume including a net capacity of the substrate 10 and a capacity of inner spaces (cells). Namely, the volume of the substrate 10 includes a volume of the catalyst coat layer 30 formed in the spaces.

Catalyst Coat Layer

FIG. 2 schematically shows a structure of a surface portion of the rib wall 14 in the substrate 10. The rib wall 14 includes the substrate 10 and the catalyst coat layer 30 having a stack structure formed on the surface of the substrate 10. The catalyst coat layer 30 contains at least one type of noble metal that purifies the exhaust gas, and is formed to have a stack structure including a lower layer 32 provided on the substrate 10, an upper layer 34 provided on the lower layer 32, and a noble metal-containing surface layer portion 36 provided in at least a part of a surface portion of the upper layer 34.

Lower Layer

The lower layer 32 included in the catalyst coat layer 30 may contain a noble metal and a carrier carrying the noble metal. As the noble metal, a noble metal acting as an oxidation catalyst and/or a reduction catalyst is preferably adopted. Examples of such a noble metal include Rh, Pd, Pt and the like, which are platinum group metals. Among these noble metals, a noble metal acting mainly as an oxidation catalyst is preferably adopted, and it is especially preferred to use Pd. Pd has a high oxidation activity, and may contribute to purification performance mainly for carbon monoxide (CO) and hydrocarbon (HC). According to the technology disclosed herein, a noble metal contained in the noble metal-containing surface layer portion 36 described below is difficult to be oxidized by oxygen released from an oxide having an oxygen storage capacity, and thus may exhibit preferred $NO_x$ purification performance. Therefore, since the lower layer 32 includes Pd, an exhaust gas purifying catalyst that may realize high purification performance for each of CO, HC and $NO_x$ may be provided.

The lower layer 32 may contain any noble metal other than Rh, Pd and Pt to such a degree that does not spoil the performance of these noble metals. For example, ruthenium (Ru), iridium (Ir), osmium (Os) or the like may be contained.

The lower layer 32 contains an oxide having the oxygen storage capacity. The oxide may be any oxide with no specific limitation as long as having the oxygen storage capacity. For example, a Ce-containing oxide is preferably used. Examples of the Ce-containing oxide include $CeO_2$ (ceria) and a $CeO_2$-containing composite oxide containing ceria, and the like. It is especially preferred to use, among these oxides, a ceria-zirconia composite oxide ($CeO_2$—$ZrO_2$ composite oxide). The use of the ceria-zirconia composite oxide allows an A/F ratio to be controlled easily even when the concentration of oxygen in the exhaust gas is fluctuated. As a result, the noble metal contained in the lower layer 32 provides a stable catalyst activity, which may improve the exhaust gas purification performance more preferably. The amount of oxide having the oxygen storage capacity in the lower layer 32 is not specifically limited. In the case where, for example, a Ce-containing oxide is contained, the amount of Ce is not specifically limited. For example, the amount of Ce is, as being converted to $CeO_2$, generally 1 g/L to 50 g/L, preferably 10 g/L to 40 g/L, and more preferably 25 g/L to 35 g/L, per 1 liter of the volume of the substrate.

In the case where the Ce-containing oxide is a ceria-zirconia composite oxide, the mixing ratio of $CeO_2$ and $ZrO_2$ in the ceria-zirconia composite oxide may be $CeO_2$:$ZrO_2$=5:95 to 80:20, preferably 10:90 to 50:50, and more preferably 15:85 to 30:70. In the case where the mixing ratio of $CeO_2$ is in such a range, the lower layer 32 may realize a high catalyst activity and a high oxygen occlusion and release capability of the noble metal. The amount of the ceria-zirconia composite oxide in the lower layer 32 is not specifically limited, and is, for example, 5 g/L to 100 g/L, preferably 10 g/L to 80 g/L, and more preferably 40 g/L to 60 g/L, per 1 liter of the volume of the substrate.

The lower layer 32 may contain a metal oxide other than the oxide having the oxygen storage capacity mixed therein. Examples of the metal oxide include aluminum oxide (alumina: $Al_2O_3$), zirconium oxide (zirconia: $ZrO_2$), a solid solution thereof, and the like. It is preferred to use $Al_2O_3$ among these metal oxides. The mixing ratio by mass of $Al_2O_3$ and the Ce-containing oxide ($Al_2O_3$:Ce-containing oxide) is preferably in the range of 20:80 to 50:50. The content of the metal oxide in the lower layer 32 is not specifically limited, and is, for example, 5 g/L to 100 g/L, preferably 10 g/L to 80 g/L, and more preferably 40 g/L to 60 g/L, per 1 liter of the volume of the substrate.

The lower layer 32 may contain barium (Ba) incorporated thereto. The incorporation of barium suppresses toxification on the noble metal, which may improve the catalyst activity. The amount of barium is, as being converted to barium sulfate, preferably 0.1 parts by mass to 10 parts by mass, more preferably 0.5 parts by mass to 5 10 parts by mass, and still more preferably 1 part by mass to 3 parts by mass, with respect to 100 parts by mass as the sum of the oxide having the oxygen storage capacity and the metal oxide contained in the lower layer 32.

The lower layer 32 may contain another material as a sub component (mainly, an inorganic oxide) incorporated thereto. Materials that may be incorporated into the lower layer 32 include, for example, rare earth elements such as lanthanum (La), yttrium (Y) and the like, alkaline earth elements such as calcium (Ca) and the like, other transition metal elements, and the like. Among these materials, the rare earth elements such as lanthanum, yttrium and the like may increase a specific surface area at a high temperature without inhibiting the catalyst function, and thus are preferably usable as stabilizers. The content of such a sub component is preferably set to 20 parts by mass or lower (preferably, 10 parts by mass or lower) with respect to 100 parts by mass as the sum of the oxide having the oxygen storage capacity and the metal oxide contained in the lower layer 32.

The noble metal contained in the lower layer 32 is carried by a carrier formed of the oxide having the oxygen storage capacity and/or the metal oxide contained in the lower layer 32. The amount of the carried noble metal is not specifically limited, and it is appropriate that the amount thereof is in the range of 0.2 parts by mass to 20 parts by mass (e.g., 0.5 parts by mass to 10 parts by mass, preferably 1 part by mass to 3 parts by mass) with respect to 100 parts by mass of the carrier contained in the lower layer 32. In the case where the amount of the noble metal is smaller than such a range, a sufficient catalyst activity is not provided. An amount of the noble metal that is larger than such a range causes the effect to be saturated and is disadvantageous in terms of the cost.

There is no specific limitation on the method for causing the carrier in the lower layer 32 to carry the noble metal. For example, powder of the oxide having the oxygen storage capacity and/or the metal oxide may be impregnated with an aqueous solution containing a palladium salt (e.g., nitrate) or a palladium complex (e.g., tetraamine complex), and then is dried and fired.

The amount of the lower layer 32 (coating amount) is not specifically limited, and is preferably, for example, 80 g/L to 300 g/L (typically, 100 g/L to 250 g/L) per 1 liter of the volume of the substrate. In the case where the amount of the lower layer 32 is too small, there is a risk that the function of the catalyst coat layer may be decreased. In the case where the amount of the lower layer 32 is too large, there is a risk that a pressure loss is increased while the exhaust gas passes through the cells 12 in the substrate 10.

Upper Layer

The upper layer 34 included in the catalyst coat layer 30 is formed on the lower layer 32, and does not contain an oxide having the oxygen storage capacity. The noble metal-containing surface layer portion 36 is formed in the surface portion, of the upper layer 34, that faces the cells 12. Since the upper layer 34 does not include any oxide having the oxygen storage capacity, the noble metal contained in the noble metal-containing surface layer portion 36 is suppressed from being formed into an oxide, which may improve the catalyst activity of the noble metal. In this specification, the expression "not contain an oxide having the oxygen storage capacity" indicates that the upper layer 34 does not substantially contain an oxide having the oxygen storage capacity. Namely, it is indicated that any oxide having the oxygen storage capacity is not intentionally incorporated into the upper layer 34. Therefore, it is may be permitted that an oxide having the oxygen storage capacity is unintentionally incorporated from the lower layer 32, for example, during the formation of the upper layer 34 or on a stage where the exhaust gas purifying catalyst 100 is used. In addition, it is permitted that trace amount of unavoidable components is mixed, needless to say. The above-mentioned expression indicates that the amount of the oxide having the oxygen storage capacity incorporated into the upper layer 34 is decreased to generally 5% by mass or smaller, for example, 1% by mass or smaller, especially 0.1% by mass or smaller, with respect to 100% by mass as the total amount of the oxide having the oxygen storage capacity contained in the lower layer 32, although the amount thereof is not specifically limited.

The upper layer 34 may contain a metal oxide not having the oxygen storage capacity. Examples of such a metal oxide include aluminum oxide (alumina: $Al_2O_3$), zirconium oxide (zirconia: $ZrO_2$), a solid solution thereof, and the like. One of these metal oxides may be used independently, or two or more thereof may be used in combination. The content of the metal oxide in the upper layer 34 is not specifically limited, and is, for example, 5 g/L to 100 g/L, preferably 10 g/L to 80 g/L, and more preferably 40 g/L to 60 g/L, per 1 liter of the volume of the substrate.

A portion of the upper layer 34 excluding the noble metal-containing surface layer portion 36 may contain a noble metal, but it is preferred that this portion does not substantially contain a noble metal contained in the noble metal-containing surface layer portion 36. In the case where such a noble metal is contained in the entirety of the upper layer 34, the noble metal contained in a portion of the upper layer 34 that is close to the lower layer 32 may be oxidized by oxygen released by the oxide having the oxygen storage capacity contained in the lower layer 32. As a result, the $NO_x$ purification performance of the noble metal may be decreased. Therefore, no such noble metal is allowed to be contained in the portion of the upper layer 34 excluding the noble metal-containing surface layer portion 36, so that the noble metal contained in the noble metal-containing surface layer portion 36 is suppressed more preferably from being formed into an oxide. As a result, the purification performance of the noble metal for $NO_x$ is preferably improved. Therefore, an exhaust gas purifying catalyst that exhibits high purification performance even during a high-load operation or at the restart of the engine, when a large amount of $NO_x$ tends to be discharged, is realized. Herein, the expression "not substantially contain a noble metal contained in the noble metal-containing surface layer portion 36" indicates that such a noble metal is not intentionally incorporated into the upper layer 34. Therefore, it may be permitted that the noble metal is incorporated into the upper layer 34 unintentionally, for example, during the formation of the upper layer 34 and the noble metal-containing surface layer portion 36 or on a stage where the exhaust gas purifying catalyst 100 is used. In addition, it is permitted that trace amount of unavoidable components is mixed, needless to say. The above-mentioned expression indicates that the amount of the noble metal incorporated into the upper layer 34 is decreased to generally 5% by mass or smaller, for example, 1% by mass or smaller, especially 0.1% by mass or smaller, with respect to 100% by mass as the total amount of the noble metal contained in the noble metal-containing surface layer portion 36, although the amount thereof is not specifically limited.

The noble metal that may be contained in the upper layer 34 is permitted to be contained to such a degree that does not spoil the catalyst activity of the noble metal contained in the noble metal-containing surface layer portion 36. For example, the upper layer 34 may contain Rh, Pd, Pt, Ru, Ir, Os or the like.

The upper layer 34 may contain another material as a sub component (typically, an inorganic oxide) incorporated thereto. Materials that may be incorporated into the upper layer 34 include, for example, rare earth elements such as lanthanum (La), yttrium (Y) and the like, alkaline earth elements such as calcium (Ca) and the like, other transition metal elements, and the like. Among these materials, the rare earth elements such as lanthanum, yttrium and the like may increase a specific surface area at a high temperature without inhibiting the catalyst function, and therefore, are preferably usable as stabilizers. The content of such a sub component is preferably set to 20 parts by mass or lower (preferably, 10 parts by mass or lower) with respect to 100 parts by mass of the metal oxide not having the oxygen storage capacity contained in the upper layer 34.

The noble metal that may be contained in the upper layer 34 may be carried by a carrier formed of the metal oxide not having the oxygen storage capacity contained in the upper layer 34. The amount of the carried noble metal is not specifically limited, and it is appropriate that the amount thereof is in the range of 0.2 parts by mass to 20 parts by mass (e.g., 0.5 parts by mass to 10 parts by mass, preferably 1 part by mass to 3 parts by mass) with respect to 100 parts by mass of the carrier contained in the upper layer 32. In the case where the amount of the noble metal is smaller than such a range, a sufficient catalyst activity is not provided. An amount of the noble metal that is larger than such a range causes the effect to be saturated and is disadvantageous in terms of the cost. There is no specific limitation on the method for causing the carrier in the upper layer 34 to carry the noble metal.

The amount of the upper layer 34 (coating amount) is not specifically limited, and is preferably, for example, about 80 g/L to about 300 g/L (typically, 100 g/L to 250 g/L) per 1 liter of the volume of the substrate. In the case where the amount of the upper layer 34 is too small, there is a risk that the oxide having the oxygen storage capacity contained in the lower layer 32 and the noble metal contained in the noble metal-containing surface layer portion 36 is not separated from each other by a sufficient distance. In the case where the amount of the upper layer 34 is too large, there is a risk that a pressure loss is increased while the exhaust gas passes through the cells 12 in the substrate 10.

Noble Metal-Containing Surface Layer Portion

The noble metal-containing surface layer portion 36 is formed in at least a part of the surface portion, of the upper layer 34, that faces the cells 12.

In a preferred embodiment of this embodiment, as shown in FIG. 3, the noble metal-containing surface layer portion 36 includes at least a front-stage noble metal-containing surface layer portion 36*a* formed from an exhaust gas entrance-side end 10*a* toward an exhaust gas exit and a rear-stage noble metal-containing surface layer portion 36*b* formed from an exhaust gas exit-side end 10*b* toward an exhaust gas entrance.

There is no specific limitation on the range in which the front-stage noble metal-containing surface layer portion 36*a* is formed. Length $L_1$ from the exhaust gas entrance-side end 10*a* to a downstream end of the front-stage noble metal-containing surface layer portion 36*a* in an exhaust gas flow direction may be, for example, 30% or longer, preferably 40% or longer, and more preferably 50% or longer, of length Lw, which is a length from the exhaust gas entrance-side end 10*a* to the exhaust gas exit-side end 10*b*. Since the front-stage noble metal-containing surface layer portion 36*a* is formed in such a range, the warmup characteristics are improved. Therefore, exhaust gas purification performance exhibiting a high exhaust gas catalyst activity may be realized even in a low temperature state immediately after the engine is started.

There is no specific limitation on the range in which the rear-stage noble metal-containing surface layer portion 36*b* is formed. Length $L_2$ from the exhaust gas exit-side end 10*b* to an upstream end of the rear-stage noble metal-containing surface layer portion 36*b* in the exhaust gas flow direction may be, for example, 30% or longer, preferably 40% or longer, and more preferably 50% or longer, of length Lw. Since the rear-stage noble metal-containing surface layer portion 36*b* is formed in such a range, the frequency at which the exhaust gas and the noble metal contained in the rear-stage noble metal-containing surface layer portion 36*b* contact each other is increased. Therefore, high exhaust gas purification performance may be realized even during a high-load operation or at the restart of the engine.

In a preferred embodiment, the noble metal-containing surface layer portion 36 is formed entirely from the exhaust gas entrance-side end 10*a* to the exhaust gas exit-side end 10*b*. In other words, it is preferred that $L_1$, $L_2$ and Lw mentioned above have the relationship of $L_1+L_2=Lw$. According to such a structure, the warmup characteristics are improved, and the frequency at which the noble metal contained in the noble metal-containing surface layer portion and the exhaust gas contact each other is increased. Therefore, high purification performance may be realized more preferably in a low temperature state immediately after the engine is started, as well as during a high-load operation and at the restart of the engine.

As the noble metal contained in the noble metal-containing surface layer portion 36, a noble metal acting as an oxidation catalyst and/or a reduction catalyst is preferably adopted. Examples of such a noble metal include Rh, Pd, Pt and the like, which are platinum group metals. Among these noble metals, a noble metal acting mainly as a reduction catalyst is preferably adopted, and it is especially preferred to use Rh. Rh has a high reduction activity, and contributes to purification performance for $NO_x$. Rh contained in the noble metal-containing surface layer portion 36 is located away from the oxide having an oxidation storage capacity. Therefore, Rh is suppressed from being formed into an oxide, and Rh may exhibit a high reduction activity ($NO_x$ purification performance).

The amount of the noble metal contained in the noble metal-containing surface layer portion 36 is not specifically limited, and is, for example, 0.01 g/L to 10 g/L, preferably 0.05 g/L to 5 g/L, and more preferably 0.1 g/L to 1 g/L, per 1 liter of the volume of the substrate. In the case where the amount of the noble metal is smaller than such a range, a sufficient catalyst activity is not provided. An amount of the noble metal that is larger than such a range causes the effect to be saturated and is disadvantageous in terms of the cost.

The average thickness of the noble metal-containing surface layer portion 36 in a direction in which the lower layer 32 and the upper layer 34 are stacked is not specifically limited, and is preferably, for example, 20 μm or less (e.g., 1 μm to 10 μm) from a surface, of the noble metal-containing surface layer portion 36, that faces the cells 12. With such an arrangement, high warmup characteristics and high purification performance during a high-load operation and at the restart of the engine are realized preferably.

The carrier carrying the noble metal contained in the noble metal-containing surface layer portion 36 disclosed herein may be any of the metal oxides not having the oxygen storage capacity described above as being contained in the upper layer 34. There is no specific limitation on the method for forming the noble metal-containing surface layer portion 36. For example, an exhaust gas purifying catalyst including the lower layer 32 formed on the substrate and also including the upper layer 34 formed on the lower layer 32 is immersed in an aqueous solution of a noble metal and dried, so that the metal oxide present in the surface portion of the upper layer 34 is allowed to carry the noble metal. In this manner, the noble metal-containing surface layer portion 36 may be formed.

Method for Forming the Catalyst Coat Layer

The catalyst coat layer 30 may be formed by a known method. For example, first, slurries for forming the lower layer 32 and the upper layer 34 to be included in the catalyst coat layer 30 are prepared. The slurries each contain the carrier and/or the noble metal as well as other components to be contained in the respective layer. The prepared slurry for forming the lower layer 32 is applied onto the substrate by wash-coating, dried and fired to form the lower layer 32. After the lower layer 32 is formed, the prepared slurry for forming the upper layer 34 is applied onto the entirety of the substrate by wash-coating, dried and fired to form the upper layer 34. After the upper layer 34 is formed, the entirety of the substrate, or a portion of the substrate having a predetermined length from the exhaust gas entrance-side end or from the exhaust gas exit-side end, is immersed in, for example, an aqueous solution or a slurry containing the noble metal, and dried. In this manner, the noble metal-containing surface layer portion 36 (or the front-stage noble metal-containing surface layer portion 36*a* and the rear-stage noble metal-containing surface layer portion 36*b*) may be formed in the surface portion, of the upper layer 34, that faces the cells 12.

The conditions under which the slurries applied by wash-coating are dried vary in accordance with the shape or the size of the substrate or the carrier. For example, the slurries may be dried at about 80° C. to about 300° C. (e.g., 100° C. to 250° C.) for about 0.1 hours to about 10 hours. The conditions under which the slurries are fired vary in accordance with the target specific surface area. The slurries is fired at about 400° C. to about 1200° C. for about 1 hour to about 10 hours, for example, at about 400° C. to about 1000° C. (e.g., 500° C. to 700° C.) for about 1 hour to about 4 hours. In the process of forming the catalyst coat layer 30 by wash-coating, a binder may be incorporated into each of the slurries in order to appropriately cause the slurries to adhere to the substrate. As the binder, for example, alumina sol, silica sol or the like is preferably usable. The viscosity of each of the slurries may be adjusted such that the slurry may easily flow into the cells in the substrate.

The exhaust gas purifying catalyst disclosed herein suppresses the noble metal contained in the noble metal-containing surface layer portion from being formed into an oxide and thus may improve the $NO_x$ purification performance of the noble metal. As a result, preferred exhaust gas purification performance is realized. Therefore, the exhaust gas purifying catalyst may be preferably set in, for example, an exhaust system (exhaust pipe) of a gasoline engine or a diesel engine of an automobile. In a hybrid electric vehicle, there is a tendency that a large amount of $NO_x$, is discharged at the restart of the engine. Therefore, the exhaust gas purifying catalyst disclosed herein is preferably usable.

The exhaust gas purifying catalyst 100 according to an embodiment of the technology disclosed herein has been described. The technology disclosed herein is not limited to the embodiment described above.

For example, the noble metal-containing surface layer portion may be provided, instead of in the surface portion of the upper layer, on the upper layer as a new layer. In this case, for example, a slurry containing a mixture of a carrier (e.g., a metal oxide not having the oxygen storage capacity) and a noble metal is prepared. The slurry is applied onto an exhaust gas purifying catalyst, including the lower layer formed on the substrate and the upper layer formed on the lower layer, by wash-coating, dried and fired. In this manner, a noble metal-containing layer is formed on the upper layer.

Hereinafter, an example of the technology disclosed herein will be described. It is not intended that the technology disclosed herein is limited to the following example.

Substrate for Testing

A honeycomb substrate formed of cordierite having a total length of 130 mm, a capacity of 1.1 L and a cylindrical shape was prepared. The following test was performed by use of the honeycomb substrate as a substrate for testing.

EXAMPLE 2 g/L of palladium nitrate, 50 g/L of $Al_2O_3$ and 50 g/L of $CeO_2$—$ZrO_2$ composite oxide were mixed together to form a slurry 1. The slurry 1 was applied onto the entirety of a honeycomb substrate by wash-coating, dried at 250° C. for 1 hour and fired at 500° C. for 1 hour to form a lower layer on the honeycomb substrate. Next, 25 g/L of $Al_2O_3$ and 25 g/L of Zr oxide were mixed together to prepare a slurry 2. The slurry 2 was applied onto the entirety of the honeycomb substrate having the lower layer formed thereon by wash-coating, dried at 250° C. for 1 hour and fired at 500° C. for 1 hour to prepare an upper layer on the lower layer. The entirety of the honeycomb substrate having the lower layer and the upper layer formed thereon was immersed in 0.1 g/L of rhodium nitrate and dried at 250° C. for 1 hour to form a noble metal-containing surface layer portion containing Rh in the entirety of a surface portion of the upper layer. The noble metal-containing surface layer portion had an average thickness of 10 μm in a stack direction. In this manner, an exhaust gas purifying catalyst in an example was obtained.

Comparative Example

A lower layer was formed on a honeycomb substrate in substantially the same manner as in the example. Next, 0.1 g/L of rhodium nitrate, 25 g/L of $Al_2O_3$ and 25 g/L of $CeO_2$—$ZrO_2$ composite oxide were mixed together to prepare a slurry 3. The slurry 3 was applied onto the entirety of the honeycomb substrate having the lower layer formed thereon by coating, dried at 250° C. for 1 hour and fired at 500° C. for 1 hour to form an upper layer on the lower layer. In this manner, an exhaust gas purifying catalyst in a comparative example was obtained. The amount of Rh contained in the upper layer of the exhaust gas purifying catalyst in the comparative example and the amount of Rh contained in the noble metal-containing surface layer portion in the example were adjusted to be equivalent to each other.

Durability Test

The exhaust gas purifying catalysts in the example and the comparative example were each attached to a gasoline engine having an engine displacement of 4600 cc, and subjected to a durability test with an average rotation rate of the engine of 3500 rpm at a temperature of the exhaust gas at an entrance of the catalyst of 1000° C. for 50 hours.

Evaluation on the Warmup (WU) Characteristics

After the durability test, the exhaust gas purifying catalysts in the example and the comparative example were each attached to a gasoline engine having an engine displacement of 2500 cc, and the warmup characteristics thereof were evaluated. While the temperature of the gas when the gas was put into the catalyst was set to a constant level of 500° C., the concentrations of HC, CO and $NO_x$ contained in the exhaust gas after the exhaust gas passed through the exhaust gas purifying catalyst were measured. The time period until the purification ratio for HC, CO and $NO_x$ reached 50% (exhaust gas 50% purification time) was measured.

Figure 4:
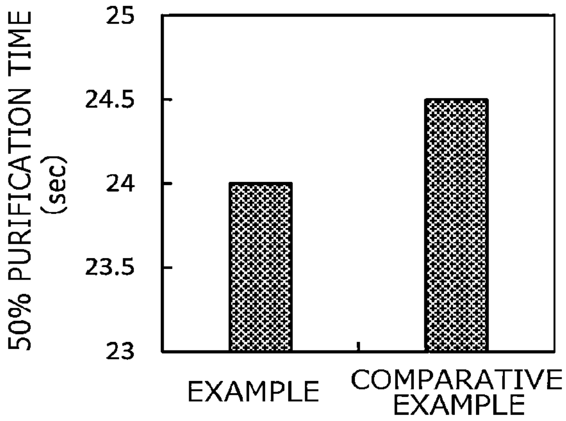
FIG. 4 is a graph showing the warmup (WU) characteristics of exhaust gas purifying catalysts in an example and a comparative example.

As shown in FIG. 4, the exhaust gas purifying catalyst in the example caused the purification ratio for HC, CO and $NO_x$ to reach 50% in a shorter time than the exhaust gas purifying catalyst in the comparative example. Thus, the exhaust gas purifying catalyst in the example has been confirmed to have improved warmup characteristics.

Evaluation on the High-Load Performance

After the durability test, the exhaust gas purifying catalysts in the example and the comparative example were each attached to a gasoline engine having an engine displacement of 2500 cc, and the exhaust gas purification performance thereof during a high-load operation was evaluated. Each of the exhaust gas purifying catalysts was attached to the gasoline engine having an engine displacement of 2500 cc, and the rotation rate of the engine was set to 2600 rpm and the air/fuel ratio (A/F ratio) was swept from 15.0 to 14.0. The concentrations of HC, CO and $NO_x$ contained in the exhaust gas after the exhaust gas passed through the exhaust gas purifying catalyst were measured to find the exhaust gas purification ratio.

Figure 5:
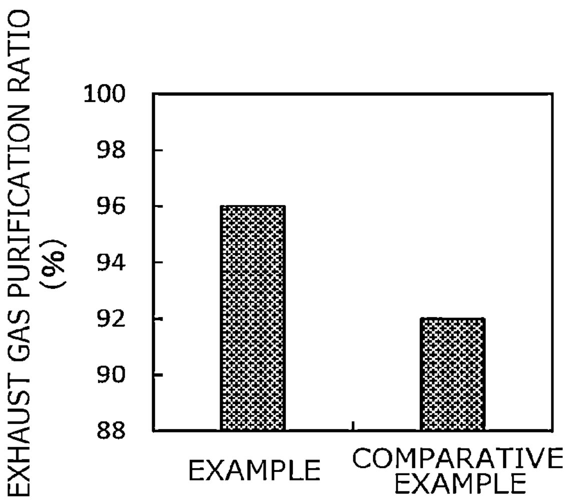
FIG. 5 is a graph showing the exhaust gas purification ratios of the exhaust gas purifying catalysts in the example and the comparative example during a high-load operation.

As shown in FIG. 5, the exhaust gas purifying catalyst in the example had improved exhaust gas purification performance for HC, CO and $NO_x$ contained in the exhaust gas as compared with the exhaust gas purifying catalyst in the comparative example. Thus, the exhaust gas purifying catalyst in the example has been confirmed to exhibit high exhaust gas purification performance even during a high-load operation in which the A/F ratio is rich (in an atmosphere in which the fuel ratio is on the higher side with an A/F ratio lower than 14.7).

Specific examples of the technology disclosed herein have been described in detail. These specific examples are merely examples and do not limit the scope of the claims. The technology defined by the claims encompasses various modifications and alterations of the specific examples described above.

The invention claimed is:

1. An exhaust gas purifying catalyst located in an exhaust gas path of an internal combustion engine and containing at least one type of noble metal that purifies exhaust gas discharged from the internal combustion engine, the exhaust gas purifying catalyst comprising:

a substrate, and a catalyst coat layer disposed on a surface of the substrate, wherein:

the catalyst coat layer is disposed to have a stack structure including a lower layer provided on the substrate and an upper layer provided on the lower layer, the lower layer contains a noble metal and an oxide having an oxygen storage capacity, the upper layer has a noble metal-containing surface layer portion containing Rh as a noble metal disposed in at least a part of the noble metal-containing surface layer portion of the upper layer, the upper layer does not contain an oxide having the oxygen storage capacity, the upper layer is disposed from an exhaust gas entrance-side end of the substrate to an exhaust gas exit-side of the substrate, and a portion of the upper layer excluding the noble metal-containing surface layer portion does not substantially contain any noble metal.

2. The exhaust gas purifying catalyst according to claim 1, wherein the noble metal-containing surface layer portion is disposed at least from the exhaust gas entrance-side end of the substrate toward the exhaust gas exit-side of the substrate, and from the exhaust gas exit-side end of the substrate toward an exhaust gas entrance of the substrate.

3. The exhaust gas purifying catalyst according to claim 2, wherein the noble metal-containing surface layer portion is disposed entirely from the exhaust gas entrance-side end to the exhaust gas exit-side end.

4. The exhaust gas purifying catalyst according to claim 1, wherein the oxide having the oxygen storage capacity is a Ce-containing oxide.

5. The exhaust gas purifying catalyst according to claim 1, wherein the noble metal-containing surface layer portion has an average thickness of 20 μm or less in a stack direction.

6. The exhaust gas purifying catalyst according to claim 1, wherein the lower layer contains Pd.

7. The exhaust gas purifying catalyst according to claim 1, wherein the catalyst coat layer consists of the lower layer and the upper layer.

8. The exhaust gas purifying catalyst according to claim 1, wherein the noble metal-containing surface layer portion comprises the noble metal consisting of Rh.

* * * * *